US011727446B2

(12) United States Patent
Oishi et al.

(10) Patent No.: US 11,727,446 B2
(45) Date of Patent: Aug. 15, 2023

(54) DEVICE AND METHOD FOR DETECTING DISPLAY OF PROVIDED CREDIT, AND PROGRAM

(71) Applicant: NIPPON TELEGRAPH AND TELEPHONE CORPORATION, Tokyo (JP)

(72) Inventors: Yasunori Oishi, Tokyo (JP); Takahito Kawanishi, Tokyo (JP); Kaoru Hiramatsu, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 27 days.

(21) Appl. No.: 16/972,238

(22) PCT Filed: May 13, 2019

(86) PCT No.: PCT/JP2019/018888
§ 371 (c)(1),
(2) Date: Dec. 4, 2020

(87) PCT Pub. No.: WO2019/235138
PCT Pub. Date: Dec. 12, 2019

(65) Prior Publication Data
US 2021/0241323 A1    Aug. 5, 2021

(30) Foreign Application Priority Data

Jun. 5, 2018    (JP) .................................. 2018-108010

(51) Int. Cl.
*G06Q 30/00*    (2023.01)
*G06Q 30/0272*    (2023.01)
(Continued)

(52) U.S. Cl.
CPC ...... *G06Q 30/0272* (2013.01); *G10L 15/1815* (2013.01); *H04N 21/23418* (2013.01); *H04N 21/23424* (2013.01); *H04N 21/4394* (2013.01)

(58) Field of Classification Search
None
See application file for complete search history.

(56) References Cited

U.S. PATENT DOCUMENTS

2001/0031129 A1*  10/2001  Tajima ................... H04N 5/782
                                                        386/241
2005/0008325 A1*  1/2005  Ollis ...................... H04H 60/17
                                                        386/296
(Continued)

OTHER PUBLICATIONS

Chen et al. (2014) "Small-Footprint Keyword Spottingusing Deep Neural Networks," 2014 IEEE International Conference on Acoustics, Speech and Signal Processing (ICASSP), Florence, pp. 4087-4091, doi: 10.1109/ICASSP.2014.6854370.

*Primary Examiner* — Kambiz Abdi
*Assistant Examiner* — Christopher Stroud

(57) ABSTRACT

The present invention enables detection of a sponsorship credit display segment in a broadcast program with higher precision. A sponsorship credit display detection device 100 according to the present invention includes: a related phrase storage unit 120 that stores related phrases included in announcement of a sponsorship credit display and related to the sponsorship credit display, in association with estimation periods; a voice recognition unit 140 that performs voice recognition on an audio signal of the broadcast program; a related phrase detection unit 150 that detects a stored related phrase from results of the voice recognition; a sponsorship credit display segment estimation unit 160 that, using an appearance time of the detected related phrase as a start point, estimates a period corresponding to the estimation period stored in association with the detected related phrase (Continued)

as a sponsorship credit display segment; and a detection unit 170 that, among estimated sponsorship credit display segments, detects a segment that continues for at least a predetermined time period as a sponsorship credit display segment.

20 Claims, 10 Drawing Sheets

(51) Int. Cl.
    *G10L 15/18*     (2013.01)
    *H04N 21/234*    (2011.01)
    *H04N 21/439*    (2011.01)

(56) References Cited

U.S. PATENT DOCUMENTS

| | | | |
|---|---|---|---|
| 2009/0006193 A1* | 1/2009 | Forbes | G06Q 30/0269 705/40 |
| 2012/0158518 A1* | 6/2012 | Benyamin | G06Q 30/0269 705/14.66 |
| 2015/0063575 A1* | 3/2015 | Tan | G06F 16/683 381/56 |
| 2015/0067459 A1* | 3/2015 | Lester | G06F 40/169 715/203 |
| 2017/0018272 A1* | 1/2017 | Lee | G06F 16/9535 |

\* cited by examiner

Fig. 2

```
['WordName': '<sp>', 'WordID': 82551, 'WordStartTime': 1230.109985, 'WordEndTime': 1230.189941,
['WordName': 'ここ', 'WordID': 106781, 'WordStartTime': 1230.189941, 'WordEndTime': 1231.26001,
['WordName': 'から', 'WordID': 99661, 'WordStartTime': 1231.26001, 'WordEndTime': 1231.530029,
['WordName': 'は', 'WordID': 137091, 'WordStartTime': 1231.530029, 'WordEndTime': 1231.689941,
['WordName': '<sp>', 'WordID': 82551, 'WordStartTime': 1231.689941, 'WordEndTime': 1231.839966,
['WordName': '[えー]', 'WordID': 82556, 'WordStartTime': 1231.839966, 'WordEndTime': 1231.880005,
['WordName': '<sp>', 'WordID': 82551, 'WordStartTime': 1231.880005, 'WordEndTime': 1231.910034,
['WordName': '一覧', 'WordID': 109165, 'WordStartTime': 1231.910034, 'WordEndTime': 1232.329956,
['WordName': 'の', 'WordID': 135996, 'WordStartTime': 1232.329956, 'WordEndTime': 1232.459961,
['WordName': 'スポンサー', 'WordID': 217740, 'WordStartTime': 1232.459961, 'WordEndTime': 1232.9
['WordName': 'の', 'WordID': 135996, 'WordStartTime': 1232.98999, 'WordEndTime': 1233.130005,
['WordName': '提供', 'WordID': 415033, 'WordStartTime': 1233.130005, 'WordEndTime': 1233.589966
['WordName': 'で', 'WordID': 127769, 'WordStartTime': 1233.589966, 'WordEndTime': 1233.75,
['WordName': '<sp>', 'WordID': 82551, 'WordStartTime': 1233.75, 'WordEndTime': 1233.910034,
['WordName': '[えー]', 'WordID': 82556, 'WordStartTime': 1233.910034, 'WordEndTime': 1233.939941,
['WordName': '<sp>', 'WordID': 82551, 'WordStartTime': 1233.939941, 'WordEndTime': 1233.969971,
['WordName': 'お', 'WordID': 91844, 'WordStartTime': 1233.969971, 'WordEndTime': 1234.0,
['WordName': '送り', 'WordID': 530289, 'WordStartTime': 1234.0, 'WordEndTime': 1234.359985,
['WordName': 'します', 'WordID': 112906, 'WordStartTime': 1234.359985, 'WordEndTime': 1224.75,
['WordName': '<sp>', 'WordID': 82551, 'WordStartTime': 1234.75, 'WordEndTime': 1234.780029,
['WordName': '<sp>', 'WordID': 82551, 'WordStartTime': 1234.780029, 'WordEndTime': 1235.670044,
```

DEVICE AND METHOD FOR DETECTING DISPLAY OF PROVIDED CREDIT, AND PROGRAM

CROSS-REFERENCE TO RELATED APPLICATIONS

This application is a U.S. 371 Application of International Patent Application No. PCT/JP2019/018888, filed on 13 May 2019, which application claims priority to and the benefit of JP Application No. 2018-108010, filed on 5 Jun. 2018, the disclosures of which are hereby incorporated herein by reference in their entireties.

TECHNICAL FIELD

The present invention relates to a sponsorship credit display detection device, a sponsorship credit display detection method, and a computer program that detect, in a broadcast program, a sponsorship credit display segment within which a sponsorship credit display that displays a sponsor of that broadcast program.

BACKGROUND ART

Non Patent Literature 1 discloses a technique for detecting a predetermined specified word from spoken voice using a neural network.

PRIOR ART

Non Patent Literature

[NPL 1] G. Chen, C. Parada, G. Heigold, "Small-footprint keyword spotting using deep neural networks", in Proc. ICASSP 2014.

SUMMARY OF THE INVENTION

Technical Problem

For example, a broadcast program that is broadcast by television broadcasting or the like may include a commercial (hereinafter referred to as a "CM" (Commercial Message)) and a sponsorship credit display that indicates a sponsor of the broadcast program. In recent years, in order to measure the effects of a CM or the like, there are demands to specify and count CMs in broadcast programs. Further, there are demands to distinguish whether a specified CM is a CM by a sponsor of the broadcast program (hereinafter referred to as a "time CM"), or a CM broadcast in a broadcast frame defined by a broadcasting station (hereinafter referred to as a "spot CM"). A time CM is a CM associated with a broadcast program, whereas a spot CM is a CM that is not associated with a broadcast program. Therefore, in order to distinguish between a time CM and a spot CM included in a broadcast program, it is useful to detect a sponsorship credit display segment where a sponsorship credit display indicating a sponsor of that broadcast program has been displayed.

Conventionally, a sponsorship credit display is visually confirmed by a worker, which leads to an increase in cost. Using the technique described in Non Patent Literature 1, it is also conceivable to detect a specific word that appears in an announcement of a sponsorship credit display from the broadcast program. However, with the technique described in Non Patent Literature 1, even if a specific word can be detected, there is no consideration of how to detect a sponsorship credit display segment from the results of that detection.

The present invention was made in consideration of the above sort of problem, and it is an object of the present invention to provide a sponsorship credit display detection device, a sponsorship credit display detection method, and a computer program that enable detection of a sponsorship credit display segment in a broadcast program with higher precision.

Means for Solving the Problem

In order to solve the above problem, a sponsorship credit display detection device according to the present invention is a sponsorship credit display detection device that detects, in a broadcast program, a sponsorship credit display segment where a sponsorship credit display indicating a sponsor of that broadcast program has been displayed, the sponsorship credit display detection device including: a related phrase storage unit that stores a related phrase included in an announcement of the sponsorship credit display and related to the sponsorship credit display, in association with an estimation period where at least one predetermined period before or after an appearance time of the related phrase is estimated as the sponsorship credit display segment; a voice recognition unit that performs voice recognition on an audio signal of the broadcast program; a related phrase detection unit that detects a related phrase stored in the related phrase storage unit from results of the voice recognition by the voice recognition unit; a sponsorship credit display segment estimation unit that, using an appearance time of the related phrase detected by the related phrase detection unit as a start point, estimates a period corresponding to the estimation period stored in the related phrase storage unit in association with the detected related phrase as the sponsorship credit display segment; and a detection unit that, among sponsorship credit display segments estimated by the sponsorship credit display segment estimation unit, detects a segment that continues for at least a predetermined time period as the sponsorship credit display segment.

Also, in order to solve the above problem, a sponsorship credit display detection method according to the present invention is a sponsorship credit display detection method in a sponsorship credit display detection device that detects, in a broadcast program, a sponsorship credit display segment where a sponsorship credit display indicating a sponsor of that broadcast program has been displayed, the sponsorship credit display detection method including: a storage step of storing a related phrase included in an announcement of the sponsorship credit display and related to the sponsorship credit display, in association with an estimation period where at least one predetermined period before or after an appearance time of the related phrase is estimated as the sponsorship credit display segment; a voice recognition step of performing voice recognition on an audio signal of the broadcast program; a detection step of detecting the stored related phrase from results of the voice recognition; a first estimation step of, using an appearance time of the detected related phrase as a start point, estimating a period corresponding to the estimation period stored in association with the detected related phrase as the sponsorship credit display segment where the sponsorship credit display has been displayed; and a detection step of detecting a segment where the estimated sponsorship credit display segment continues for at least a predetermined time period as the sponsorship credit display segment.

Also, in order to solve the above problem, a computer program according to the present invention causes a computer to function as the above sponsorship credit display detection device.

Effects of the Invention

According to a sponsorship credit display detection device, a sponsorship credit display detection method, and a computer program according to the present invention, it is possible to detect a sponsorship credit display segment in a broadcast program with higher precision.

BRIEF DESCRIPTION OF DRAWINGS

FIG. 2 shows an example of results of voice recognition by a voice recognition unit shown in FIG. 1.

DESCRIPTION OF EMBODIMENTS

Hereinafter, embodiments for carrying out the present invention will be described in detail with reference to the figures.

First Embodiment

Figure 1:
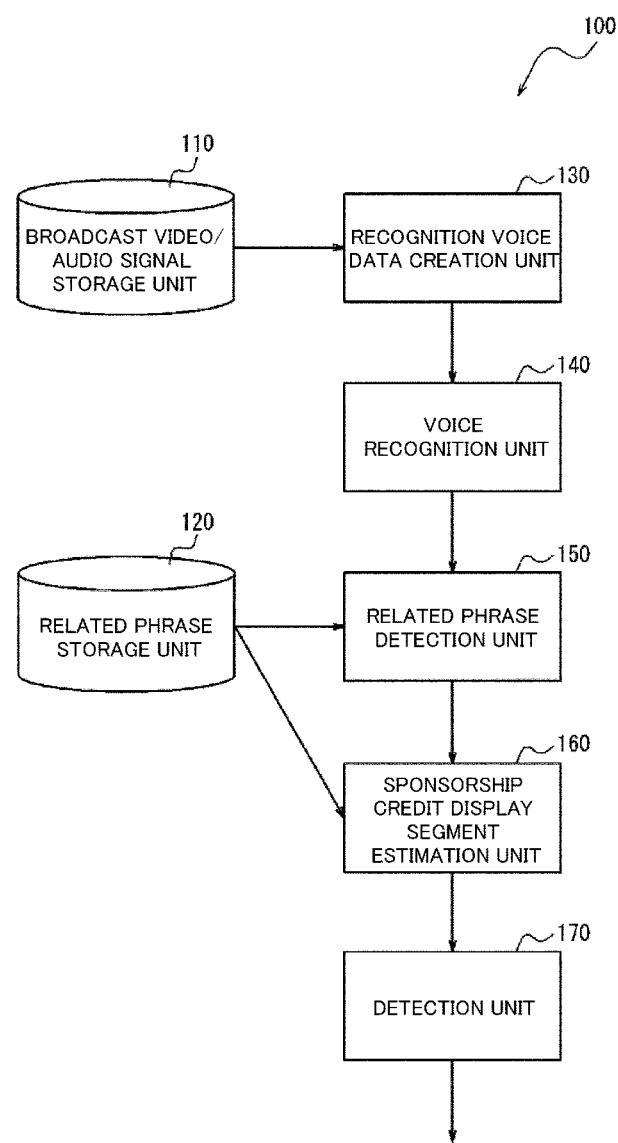
FIG. 1 shows an example configuration of a sponsorship credit display detection device according to a first embodiment of the present invention.

FIG. 1 shows an example configuration of a sponsorship credit display detection device 100 according to a first embodiment of the present invention. The sponsorship credit display detection device 100 according to the present embodiment detects, in a broadcast program, a sponsorship credit display segment where a sponsorship credit display indicating a sponsor of that broadcast program has been displayed.

The sponsorship credit display detection device 100 shown in FIG. 1 includes a broadcast video/audio signal storage unit 110, a related phrase storage unit 120, a recognition voice data creation unit 130, a voice recognition unit 140, a related phrase detection unit 150, a sponsorship credit display segment estimation unit 160, and a detection unit 170.

The broadcast video/audio signal storage unit 110 stores a broadcast video/audio signal obtained by encoding a broadcast program that is a sponsorship credit display detection target (hereinafter, referred to as "recognition target broadcast program") with a fixed time length (for example, 65 minutes). In the broadcast video/audio signal storage unit 110, for example, a signal obtained by encoding the video signal of a broadcast program according to the H.264 standard and a signal obtained by encoding the audio signal of the broadcast program according to the AAC (Advanced Audio Coding) standard are stored in the MP4 file format. It should be noted that the broadcast video/audio signal storage unit 110 is not limited to storing a video/audio signal of a broadcast program, and may also store a video/audio signal of a broadcast program for Internet distribution.

The related phrase storage unit 120 stores related phrases that are included in an announcement of a sponsorship credit display (an announcement announced when the sponsorship credit is displayed) and are related to the sponsorship credit display. Examples of related phrases include phrases often included in announcements of sponsorship credit displays, such as "you see", "sponsor", "support", and "(is/was) broadcast". Further, as related phrases, there are phrases indicating a company name, for example.

Further, associated with a related phrase, the related phrase storage unit 120 stores an estimation period in which a predetermined period of at least one of before and after the appearance time of the related phrase is estimated as a sponsorship credit display segment. The estimation period of the related phrase is set according to the position where the related phrase is likely to appear in the announcement of the sponsorship credit display.

For example, as an announcement of the sponsorship credit display, the fixed phrase "This broadcast program was broadcast with the support of the sponsors you see" is often used. In such a fixed phrase, with Japanese word order, related phrases such as "broadcast program" and "you see" tend to appear in the first half of the announcement, related phrases such as "sponsor" and "support" tend to appear in the middle of the announcement, and related phrases such as "broadcast" tend to appear later in the announcement. The related phrase estimation period is set based on such a tendency.

For example, for the related phrase "broadcast program" that is likely to appear in the first half of the announcement, "0 seconds to +5 seconds" is set as the estimation period. Also, for the related phrase "support" that is likely to appear in the middle of the announcement, "−3 seconds to +2 seconds" is set as the estimation period. Also, for the related phrase "broadcast" that is likely to appear in the latter half of the announcement, "−4 seconds to +1 second" is set as the estimation period. Note that "−X seconds to +Y seconds" refers to a segment from X seconds before the appearance time of the related phrase to Y seconds after the appearance time of the related phrase.

The recognition voice data creation unit 130 acquires the audio signal of the recognition target broadcast program from the broadcast video/audio signal storage unit 110. The recognition voice data creation unit 130 decodes the acquired audio signal and creates an audio signal for voice recognition in a predetermined format (for example, WAV format, 16 kHz, 16 bits, monaural audio signal) as voice data for voice recognition, and outputs this audio signal to the voice recognition unit 140.

The voice recognition unit 140 performs voice recognition on the voice data for voice recognition (the audio signal of the recognition target broadcast program) output from the recognition voice data creation unit 130. Specifically, the voice recognition unit 140 stores parameters to be applied to a voice recognition acoustic model/language model tuned for detecting the sponsorship credit display. The voice recognition unit 140 uses the acoustic model/language model to which the stored parameters have been applied to perform voice recognition on the audio signal of the recognition target broadcast program, and outputs the results of voice recognition to the related phrase detection unit 150. It should be noted that the parameters to be applied to the acoustic model/language model may be stored in an unshown storage unit.

FIG. 2 shows an example of results of voice recognition by the voice recognition unit 140. FIG. 2 shows the results of voice recognition with respect to the audio signal of the phrase "We now will broadcast with the support of the sponsors you see".

As shown in FIG. 2, the voice recognition unit 140 divides a target phrase into a plurality of phrases ("Word Name") by voice recognition of an audio signal, and transcribes this as text data. Further, the voice recognition unit 140, in association with each phrase ("Word Name"), outputs an ID ("Word ID") for identifying the phrase, the start time of the phrase ("Word Start Time"), and the end time of the phrase ("Word End Time") as the results of voice recognition.

Referring to FIG. 1 again, the related phrase detection unit 150 detects a related phrase stored in the related phrase storage unit 120 from the results of voice recognition by the voice recognition unit 140. The related phrase detection unit 150 outputs a signal "1" regarding the time when the related phrase was detected and a signal "0" regarding the other times to the sponsorship credit display segment estimation unit 160. The related phrase detection unit 150 performs the above-described processing at predetermined time intervals (for example, 1-second intervals). Therefore, for example, when the recognition target broadcast program is 65 minutes and the above-described processing is performed at 1-second intervals, the related phrase detection unit 150 outputs a binary time-series signal in which there are 3900 continuous instances of the signal "1" or the signal "0" in time-series to the sponsorship credit display segment estimation unit 160.

The sponsorship credit display segment estimation unit 160 estimates the sponsorship credit display segment based on the binary time-series signal output from the related phrase detection unit 150. Specifically, the sponsorship credit display segment estimation unit 160, using the appearance time of the detected related phrase (the time corresponding to the signal "1") as a start point, estimates a period corresponding to the estimation period stored in the related phrase storage unit 120 in association with the detected related phrase as the sponsorship credit display segment. For example, assume that "−X seconds to +Y seconds" is set as the estimation period in association with a certain related phrase, and the related phrase was detected at time t. In this case, the sponsorship credit display segment estimation unit 160, using the time t as the start point, estimates a time interval from time t−X to time t+Y as the sponsorship credit display segment. It should be noted that the sponsorship credit display segment estimation unit 160 outputs the results of voice recognition by the voice recognition unit 140 from the voice recognition unit 140 or from the related phrase detection unit 150. The sponsorship credit display segment estimation unit 160 acquires the results of voice recognition by the voice recognition unit 140, and therefore is able to specify the corresponding related phrase for the signal "1" included in the binary time-series signal.

The sponsorship credit display segment estimation unit 160 outputs a signal "1" regarding times estimated to be a sponsorship credit display segment and a signal "0" regarding other times to the detection unit 170. The sponsorship credit display segment estimation unit 160 performs the above-described processing at predetermined time intervals (for example, 1-second intervals). Therefore, for example, when the recognition target broadcast program is 65 minutes and the above-described processing is performed at 1-second intervals, the sponsorship credit display segment estimation unit 160 outputs a binary time-series signal in which there are 3900 continuous instances of the signal "1" or the signal "0" in time-series to the detection unit 170.

The detection unit 170, among sponsorship credit display segments estimated by the sponsorship credit display segment estimation unit 160, detects a segment that continues for at least a predetermined time period as the sponsorship credit display segment. Specifically, the detection unit 170 detects, in the binary time-series signal output from the sponsorship credit display segment estimation unit 160, a segment in which a predetermined number or more of the signals "1" are continuously arranged as the sponsorship credit display section. Here, the predetermined time period is longer than the estimation period of the related phrase and is approximately the same as the time period generally set as a sponsorship credit display segment (for example, approximately ten and several seconds).

When a related phrase appears outside the sponsorship credit display segment in the broadcast program, the sponsorship credit display segment estimation unit 160 outputs a signal "1". However, in this case, if a related phrase does not appear before or after that phrase, the period in which the signal "1" is output is only the period corresponding to the estimation period associated with the related phrase. On the other hand, in the sponsorship credit display segment, related phrases usually appear continuously, and have a length of, for example, about ten and several seconds. Therefore, by detecting a segment in which the signal "1" continues for at least a predetermined time as the sponsorship credit display segment, it is possible to detect the sponsorship credit display segment with high precision.

The detection unit 170 outputs time information of the detected sponsorship credit display segment. In the binary time-series signal output from the sponsorship credit display segment estimation unit 160, for example, when signals "1" are continuously arranged from the 300th to the 310th signals, the detection unit 170 detects a time period from 5 minutes 00 seconds to 5 minutes 10 seconds as a sponsorship credit display segment, and outputs this time information.

Figure 3:
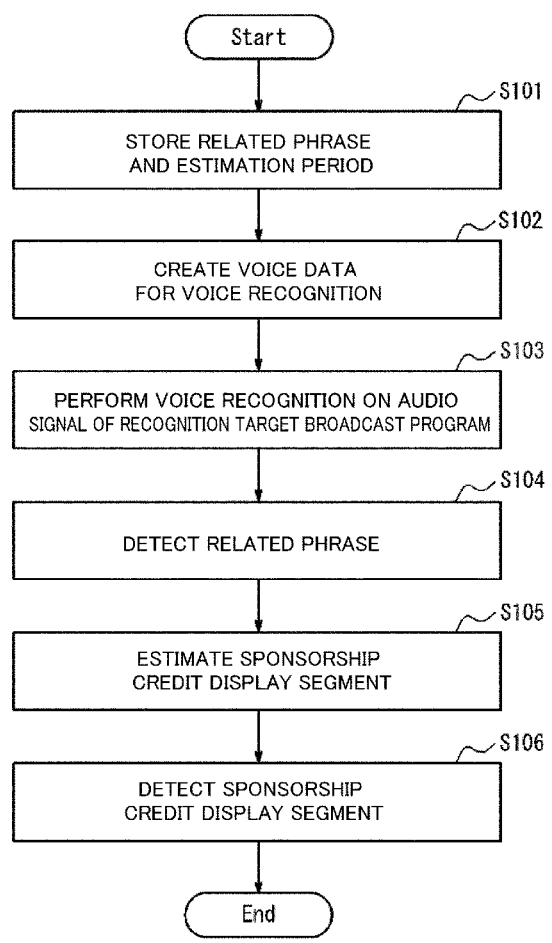
FIG. 3 is a flowchart showing an example of a sponsorship credit display detection method in the sponsorship credit display detection device shown in FIG. 1.

Next, the sponsorship credit display detection method in the sponsorship credit display detection device 100 according to the present embodiment will be described with reference to the flowchart shown in FIG. 3.

The related phrase storage unit 120 stores a related phrase included in the announcement of a sponsorship credit display and related to the sponsorship credit display, in association with an estimation period that is a predetermined period of at least one of before and after the appearance time of the related phrase (step S101).

Next, the recognition voice data creation unit 130 creates voice data for voice recognition from a broadcast program that is the recognition target (step S102).

Next, the voice recognition unit 140 performs voice recognition on the voice data for voice recognition (the audio signal of the recognition target broadcast program) created by the recognition voice data creation unit 130 (step S103).

Next, the related phrase detection unit 150 detects a related phrase stored in the related phrase storage unit 120 from the results of voice recognition by the voice recognition unit 140 (step S104).

Next, the sponsorship credit display segment estimation unit 160, using the appearance time of the related phrase detected by the related phrase detection unit 150 as a start point, estimates a period corresponding to an estimation period stored in the related phrase storage unit 120 in association with the detected related phrase as a sponsorship credit display segment (step S105).

Next, the detection unit 170, among sponsorship credit display segments estimated by the sponsorship credit display segment estimation unit 160, detects a segment that continues for at least a predetermined time period as a sponsorship credit display segment (step S106).

As described above, in the present embodiment, the sponsorship credit display detection device 100 includes the related phrase storage unit 120, the voice recognition unit 140, the related phrase detection unit 150, the sponsorship credit display segment estimation unit 160, and the detection unit 170. The related phrase storage unit 120 stores a related phrase included in an announcement of a sponsorship credit display and related to the sponsorship credit display, in association with an estimation period where at least one predetermined period before or after an appearance time of the related phrase is estimated as the sponsorship credit display segment. The voice recognition unit 140 performs voice recognition on an audio signal of a recognition target broadcast program. The related phrase detection unit 150 detects a related phrase stored in the related phrase storage unit 120 from results of the voice recognition by the voice recognition unit 140. The sponsorship credit display segment estimation unit 160, using an appearance time of the related phrase detected by the related phrase detection unit 150 as a start point, estimates a period corresponding to the estimation period stored in the related phrase storage unit 120 in association with the detected related phrase as the sponsorship credit display segment. The detection unit 170, among sponsorship credit display segments estimated by the sponsorship credit display segment estimation unit 160, detects a segment that continues for at least a predetermined time period as the sponsorship credit display segment.

By estimating the estimation period before or after a related phrase detected by voice recognition as a sponsorship credit display segment, and, among estimated sponsorship credit display segments, detecting a segment that continues for at least a predetermined time period as a sponsorship credit display segment, it is possible to detect only a segment where the related phrase continuously appears as a sponsorship credit display segment. In the broadcast program, a related phrase may appear outside a sponsorship credit display segment, but a related phrase rarely appears continuously outside a sponsorship credit display segment. Therefore, in the sponsorship credit display detection device 100 according to the present embodiment, regardless of the sponsorship credit display, even if the related phrase appears, this alone does not result in detection as a sponsorship credit display segment. Only a segment where the related phrase continuously appears at the time of the sponsorship credit display is detected as a sponsorship credit display segment, so it is possible to detect a sponsorship credit display segment in a broadcast program with higher precision.

Second Embodiment

Figure 4:
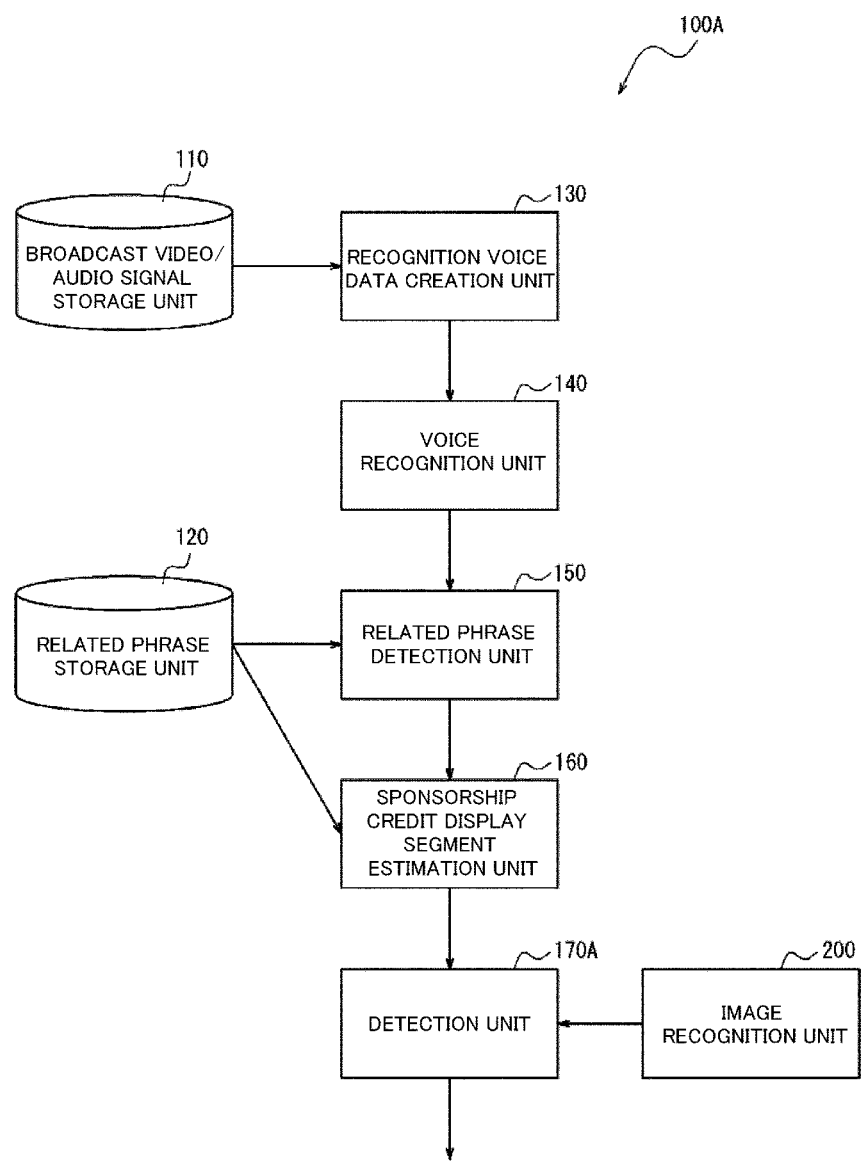
FIG. 4 shows an example configuration of a sponsorship credit display detection device according to a second embodiment of the present invention.

FIG. 4 shows an example configuration of a sponsorship credit display detection device 100A according to the second embodiment of the present invention. In FIG. 4, the same configurations as those in FIG. 1 are designated by the same reference signs, and a description thereof will be omitted here.

In the sponsorship credit display, there are cases where there is no announcement, and for example, only the phrase "support" and a company name or logo of the sponsor is displayed. In this case, with the sponsorship credit display detection device 100 according to the first embodiment it is difficult to detect a sponsorship credit display segment. In the sponsorship credit display detection device 100A according to the present embodiment, estimation of a sponsorship credit display segment using the voice recognition described in the first embodiment and estimation of a sponsorship credit display segment using image recognition are combined to achieve even higher precision of detection of sponsorship credit display segments.

The sponsorship credit display detection device 100A shown in FIG. 4 differs from the sponsorship credit display detection device 100 shown in FIG. 1 in that an image recognition unit 200 is added and the detection unit 170 is changed to a detection unit 170A. That is, the sponsorship credit display detection device 100A according to the present embodiment includes a broadcast video/audio signal storage unit 110, a related phrase storage unit 120, a recognition voice data creation unit 130, a voice recognition unit 140, a related phrase detection unit 150, a sponsorship credit display segment estimation unit 160, the detection unit 170A, and the image recognition unit 200.

The image recognition unit 200 acquires the video signal of the recognition target broadcast program, estimates a sponsorship credit display segment based on the acquired video signal of the recognition target broadcast program, and outputs the estimation results to the detection unit 170A. The details of the sponsorship credit display segment estimation by the image recognition unit 200 will be described later.

The detection unit 170A, among segments obtained by a logical sum operation or a logical product operation of a sponsorship credit display segment estimated by the sponsorship credit display segment estimation unit 160 and a sponsorship credit display segment estimated by the image recognition unit 200, estimates a segment that continues for at least a predetermined time period as a sponsorship credit display segment. Then, the detection unit 170A outputs time information of the detected sponsorship credit display segment.

Next, the sponsorship credit display segment estimation by the image recognition unit 200 will be described.

Figure 5:
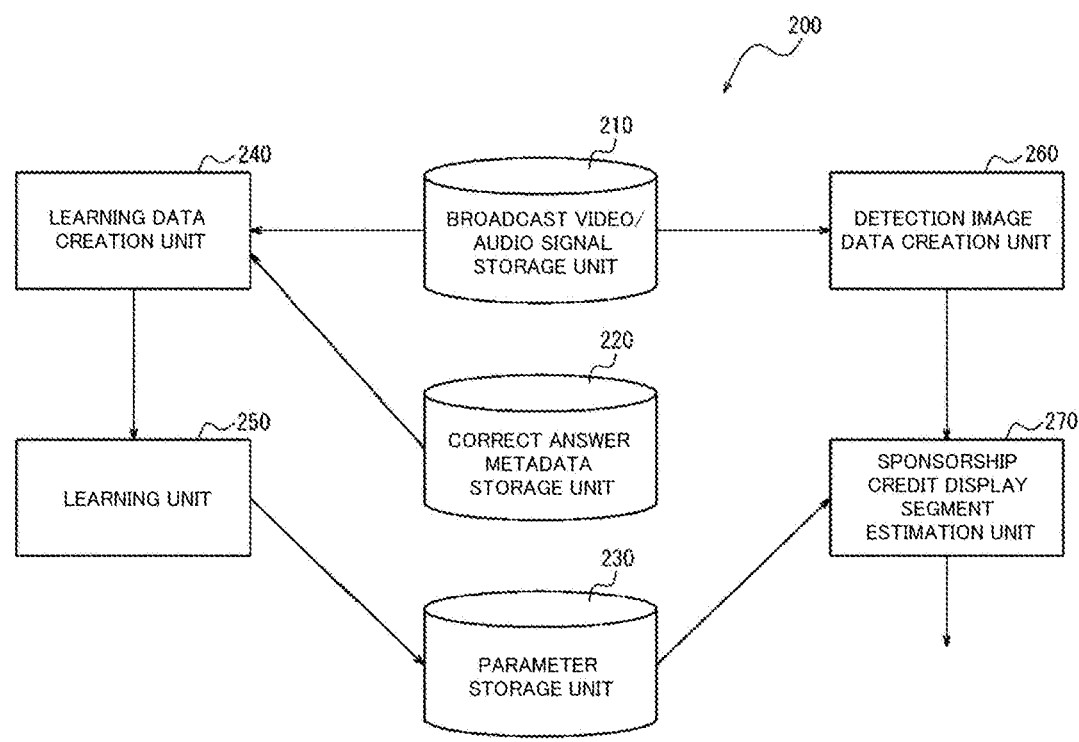
FIG. 5 shows an example configuration of an image recognition unit shown in FIG. 4.

FIG. 5 shows an example configuration of the image recognition unit 200.

The image recognition unit 200 shown in FIG. 5 includes a broadcast video/audio signal storage unit 210, a correct answer metadata storage unit 220, a parameter storage unit 230, a learning data creation unit 240, a learning unit 250, a detection image data creation unit 260, and a sponsorship credit display segment estimation unit 270.

The broadcast video/audio signal storage unit 210 stores a broadcast video/audio signal obtained by encoding a broadcast program with a fixed time length (for example, 65 minutes). In the broadcast video/audio signal storage unit 210, for example, a signal obtained by encoding the video signal of a broadcast program according to the H.264 standard and a signal obtained by encoding the audio signal of the broadcast program according to the AAC standard are stored in the MP4 file format. The broadcast video/audio signal storage unit 210 stores a broadcast program in which the time when a sponsorship credit display is displayed has been detected by a worker or the like (hereinafter referred to as a "broadcast program whose sponsorship credit display has been detected"), and stores a broadcast video/audio signal of the recognition target broadcast program. It should be noted that the broadcast program whose sponsorship credit display has been detected and the broadcast video/audio signal of the recognition target broadcast program may be stored in the broadcast video/audio signal storage unit 110. In this case, the broadcast video/audio signal storage unit 210 does not need to be provided.

The correct answer metadata storage unit 220 stores time information indicating the time when the sponsorship credit display was displayed in the broadcast program. The time at which the sponsorship credit display was displayed is, for example, visually confirmed in advance by a worker and stored in the correct answer metadata storage unit 220.

The parameter storage unit 230 stores parameters to be applied to a detection model for detecting the sponsorship credit display in the broadcast program, described later. The detection model is, for example, a model using a convolutional neural network. Although a detailed description is omitted, a convolutional neural network generally has a configuration in which a convolution layer and a pooling layer are repeatedly arranged in this order from an input side a plurality of times, and then a fully connected layer is arranged. In the convolution layer, processing that applies a convolution filter to an input image is performed. In the pooling layer, processing is performed in which a rectangular filter is applied to the output of the convolution layer while sequentially shifting the filter, and the maximum value in the rectangular filter is extracted to generate a new image. In the fully-combined layer, processing is performed in which image data from which characteristic portions have been extracted by the convolution layer and the pooling layer is combined into one node, and a value converted by an activation function is output. For example, when the detection model is a model using a convolutional neural network, the parameter storage unit 230 stores a filter weight of the filter applied in each layer, a bias parameter added to the output of the convolution layer, and the like.

The learning data creation unit 240 acquires, from the broadcast video/audio signal storage unit 210, the broadcast video/audio signal of a broadcast program for which a sponsorship credit display has been detected. In addition, the learning data creation unit 240 acquires the time information of the sponsorship credit display in that broadcast program from the correct answer metadata storage unit 220. As learning data, from the broadcast program for which the sponsorship credit display has been detected, the learning data creation unit 240 creates a still image in which the sponsorship credit display is displayed (hereinafter referred to as a still image with the sponsorship credit display) and a still image in which the sponsorship credit display is not displayed (hereinafter referred to as a "still image without the sponsorship credit display").

Specifically, the learning data creation unit 240 decodes the acquired video signal and creates still images that are continuous in time-series at predetermined time intervals. It should be noted that the still images may be created using only an I frame that has been intra-coded between screens. For example, the learning data creation unit 240 creates a still image every one second. In this case, the learning data creation unit 240 creates, for example, 3900 still images that are continuous in time-series at 1-second intervals for a 65-minute broadcast program.

Next, the learning data creation unit 240 extracts still images with the sponsorship credit display from the generated still images based on the acquired time information. Further, the learning data creation unit 240 extracts still images without the sponsorship credit display from the generated still images. Still images without the sponsorship credit display are randomly extracted from the still images at times other than the time indicated by the acquired time information. The learning data creation unit 240 extracts, for example, about 8000 still images with the sponsorship credit display and about 8000 still images without the sponsorship credit display. In this case, for example, when the broadcast time period of the broadcast program whose sponsorship credit display has been detected is 65 minutes, the learning data creation unit 240 performs the above-described processing for a plurality of broadcast programs and extracts the required number of still images. The learning data creation unit 240 outputs extracted still images with the sponsorship credit display and extracted still images without the sponsorship credit display to the learning unit 250 as learning data.

The learning unit 250 learns parameters to be applied to the detection model for detecting the sponsorship credit display in the broadcast program using the learning data created by the learning data creation unit 240 (the still images with the sponsorship credit display and the still images without the sponsorship credit display). For example, when the detection model is a model using the above convolutional neural network, the learning unit 250 learns the filter weight and the bias parameters by using a probabilistic gradient method. The learning unit 250 stores the learned parameters in the parameter storage unit 230.

The detection image data creation unit 260 acquires the video signal of the broadcast program that is the recognition target from the broadcast video/audio signal storage unit 210. The detection image data creation unit 260 decodes the video signal of the acquired recognition target broadcast program, and creates still images that are continuous in time-series at predetermined time intervals. For example, the detection image data creation unit 260 creates a still image every one second. In this case, the detection image data creation unit 260 creates, for example, 3900 still images that are continuous in time-series at 1-second intervals for a 65-minute broadcast program. The detection image data creation unit 260 outputs the created still images that are continuous in time-series to the sponsorship credit display segment estimation unit 270.

The sponsorship credit display segment estimation unit 270 estimates the sponsorship credit display segment in the broadcast program that is the recognition target using the detection model to which the parameters learned by the learning unit 250 have been applied.

Specifically, the sponsorship credit display segment estimation unit 270 sequentially inputs, to the detection model for detecting the sponsorship credit display in the broadcast program, the detection image data (still images of the broadcast program that is the recognition target) that has been output from the detection image data creation unit 260. Then, the sponsorship credit display segment estimation unit 270 generates a time-series signal indicating the presence or absence of the sponsorship credit display in each still image based on an output value of the detection model for each still image. Here, the sponsorship credit display segment estimation unit 270 applies the parameters stored in the parameter storage unit 230 to the detection model. For example, when the detection model is a model using a convolutional neural network, the sponsorship credit display segment estimation unit 270 constructs a network (a detection model) in which the parameters stored in the parameter storage unit 230 are fixed values.

If the output value of the detection model is at least a predetermined threshold value, the sponsorship credit display segment estimation unit 270 determines that the input still image is a still image with the sponsorship credit display, and for example, outputs a signal "1". When the output value of the detection model is less than the predetermined threshold value, the sponsorship credit display segment estimation unit 270 determines that the input still image is a still image without the sponsorship credit display, and for example, outputs a signal "0". The sponsorship credit display segment estimation unit 270 performs the above-described determination for each still image continuous in time-series of the recognition target broadcast program, and generates a binary time-series signal indicating the presence or absence of a sponsorship credit display in each still image with a signal "0" or a signal "1". That is, the sponsorship credit display segment estimation unit 270 generates a binary time-series signal that is a signal "1" for a segment estimated to be a sponsorship credit display segment, and a signal "0" for other segments. The sponsorship credit display segment estimation unit 270 outputs the generated binary time-series signal to the detection unit 170A.

Generally, in the sponsorship credit display, white characters, colored characters, and the like surrounded with a black frame are used as the characters indicating a sponsor name. Further, in the sponsorship credit display, characters of various fonts are used as the characters indicating the sponsor name. Further, even in the sponsorship credit display, there are cases where the characters "sponsor" are included and cases where the characters "sponsor" are not included. Further, the sponsorship credit display may include only a sponsor logo. Further, the position of the sponsorship credit display may be the entire screen, lower right, lower left, upper right, upper left, or lower center. As described above, the sponsorship credit display has various variations. It is difficult to detect such various variations of the sponsorship credit display using, for example, a feature vector of an object appearing in an image.

In the image recognition unit 200 shown in FIG. 5, learning data is created from a broadcast program for which the sponsorship credit display has been detected, and the learning data is used to learn the parameters to be applied to the detection model for detecting the sponsorship credit display in the broadcast program. Also, the image recognition unit 200 shown in FIG. 5 estimates the sponsorship credit display segment in the broadcast program that is the recognition target using the detection model to which the learned parameters have been applied. Therefore, according to the image recognition unit 200 shown in FIG. 5, by using sponsorship credit displays of various variations as the learning data, it is possible to detect the sponsorship credit display segment even for a sponsorship credit display with various variations as described above. Also, according to the image recognition unit 200 shown in FIG. 5, because the video signal of the broadcast program that is the recognition target is used, the sponsorship credit display segment can be detected even when there is no announcement.

Figure 6:
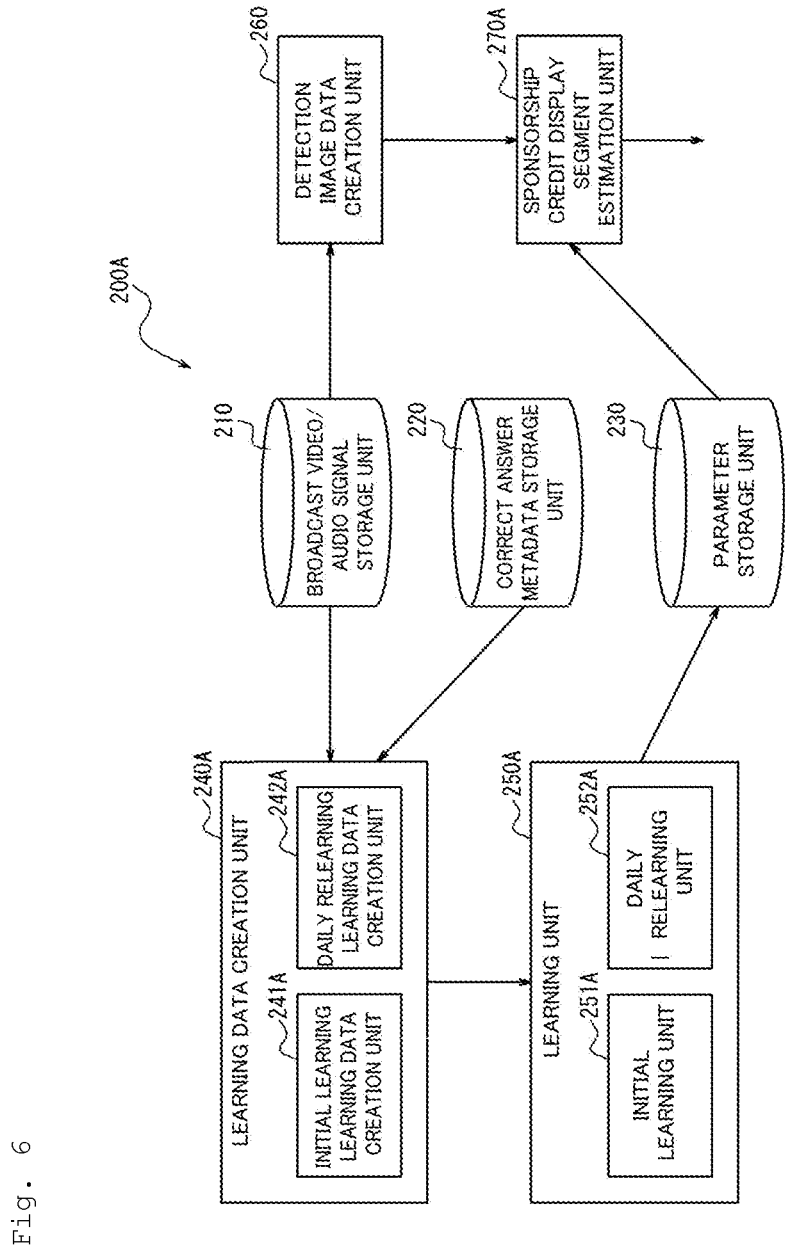
FIG. 6 shows another example configuration of the image recognition unit shown in FIG. 4.

It should be noted that the image recognition unit that estimates a sponsorship credit display segment based on the video signal of a broadcast program is not limited to the image recognition unit 200 shown in FIG. 5. FIG. 6 shows an example configuration of an image recognition unit 200A that estimates a sponsorship credit display segment based on the video signal of a broadcast program. In FIG. 6, the same configurations as those in FIG. 5 are designated by the same reference signs, and a description thereof will be omitted here.

The image recognition unit 200A shown in FIG. 6 differs from the image recognition unit 200 shown in FIG. 5 in that the learning data creation unit 240 is changed to a learning data creation unit 240A, the learning unit 250 is changed to a learning unit 250A, and the sponsorship credit display segment estimation unit 270 is changed to a sponsorship credit display segment estimation unit 270A.

The learning data creation unit 240A acquires, for each day of the week, a broadcast signal of a broadcast program for which a sponsorship credit display has been detected from the broadcast video/audio signal storage unit 210. Further, the learning data creation unit 240A acquires the time information of the sponsorship credit display in that broadcast program from the correct answer metadata storage unit 220. The learning data creation unit 240A creates learning data for each day of the week from the broadcast program of each day of the week on which the acquired sponsorship credit display has been detected, and outputs the learning data to the learning unit 250A. The learning data creation unit 240A includes an initial learning learning data creation unit 241A, and a daily relearning learning data creation unit 242A.

The initial learning learning data creation unit 241A acquires the video signal of a broadcast program for which the sponsorship credit display has been detected from the broadcast video/audio signal storage unit 210. For example, the initial learning learning data creation unit 241A acquires the video signal of a broadcast program for one day one month ago. Further, the initial learning learning data creation unit 241A acquires the time information of the sponsorship credit display in the broadcast program for which the video signal was acquired from the correct answer metadata storage unit 220. Then, the initial learning learning data creation unit 241A creates learning data for initial learning of the detection model from the acquired broadcast program in which the sponsorship credit display was detected, based on the time information of the sponsorship credit display in that broadcast program.

Specifically, the initial learning learning data creation unit 241A decodes the acquired video/audio signal and creates still images that are continuous in time-series at predetermined time intervals. For example, the initial learning learning data creation unit 241A creates a still image every one second. In this case, the initial learning learning data creation unit 241A creates, for example, 3900 still images that are continuous in time-series at 1-second intervals for a 65-minute broadcast program.

Next, the initial learning learning data creation unit 241A extracts still images with a sponsorship credit display from the generated still images based on the acquired time information. Also, the initial learning learning data creation unit 241A extracts still images without the sponsorship credit display from the generated still images. The still images without the sponsorship credit display are randomly extracted from the still images at times other than the time indicated by the acquired time information. The initial learning learning data creation unit 241A extracts, for example, about 8000 still images with the sponsorship credit display and about 8000 still images without the sponsorship credit display. The initial learning learning data creation unit 241A outputs the extracted still images with the sponsorship credit display and the extracted still images without the sponsorship credit display to the learning unit 250A as learning data for initial learning of the detection model.

The daily relearning learning data creation unit 242A acquires, for each day of the week, the video signal of a broadcast program for which the sponsorship credit display has been detected from the broadcast video/audio signal storage unit 210. For example, the daily relearning learning data creation unit 242A acquires the video signal of broadcast programs for each day one week ago. Further, the daily relearning learning data creation unit 242A acquires the time information of the sponsorship credit display in the broadcast programs for which the video signal was acquired from the correct answer metadata storage unit 220. Then, the daily relearning learning data creation unit 242A creates learning data for relearning of the detection model from the broadcast program in which the sponsorship credit display was detected, for each day of the week, based on the time information of the sponsorship credit display in that broadcast program.

Specifically, the daily relearning learning data creation unit 242A decodes the acquired broadcast video/audio signal and creates still images that are continuous in time-series at predetermined time intervals. For example, the daily relearning learning data creation unit 242A creates a still image every one second. In this case, the daily relearning learning data creation unit 242A creates, for example, 3900 still images that are continuous in time-series at 1-second intervals for a 65-minute broadcast program.

Next, the daily relearning learning data creation unit 242A extracts still images with a sponsorship credit display from the generated still images based on the acquired time information. Also, the daily relearning learning data creation unit 242A extracts still images without a sponsorship credit display from the generated still images. The still images without a sponsorship credit display are randomly extracted from the still images at times other than the time indicated by the acquired time information. The daily relearning learning data creation unit 242A extracts, for example, about 1000 still images with the sponsorship credit display and about 1000 still images without the sponsorship credit display. The learning data creation unit 242A performs the above processing for each day of the week. Then, the daily relearning learning data creation unit 242A outputs the extracted still images with the sponsorship credit display and the extracted still images without the sponsorship credit display that were extracted for each day of the week to the learning unit 250A as relearning data for each day of the week.

The learning unit 250A uses the learning data for each day of the week created by the learning data creation unit 240A to learn (relearn) the parameters to be applied to the detection model for each day of the week. The learning unit 250A includes an initial learning unit 251A and a daily relearning unit 252A.

The initial learning unit 251A learns parameters to be applied to the detection model for detecting the sponsorship credit display in the broadcast program using the learning data for initial learning created by the initial learning learning data creation unit 241A. For example, when the detection model is a model using the above convolutional neural network, the initial learning unit 251A learns the filter weight and the bias parameters by using a probabilistic gradient method. The initial learning unit 251A stores the learned parameters in the parameter storage unit 230.

The daily relearning unit 252A uses the relearning data for each day of the week created by the daily relearning learning data creation unit 242A to learn the parameters to be applied to the detection model for detecting the sponsorship credit display in the broadcast program for each day of the week. The daily relearning unit 252A stores the learned parameters in the parameter storage unit 230. That is, the daily relearning unit 252A learns the parameters applied to the detection model for each day of the week, and stores the parameters in the parameter storage unit 230. By learning (relearning) the parameters applied to the detection model using the relearning data for each day of the week, it is possible to set parameters suitable for detecting the sponsorship credit display in the broadcast program for each day of the week.

The sponsorship credit display segment estimation unit 270A applies the parameters stored in the parameter storage unit 230, learned for the day of the week on which the broadcast program that is the recognition target is to be broadcast, to the detection model, and estimates a sponsorship credit display segment in the recognition target broadcast program.

Specifically, the sponsorship credit display segment estimation unit 270A sequentially inputs, to the detection model for detecting the sponsorship credit display in the broadcast program, the still images that are continuous in a time-series of the broadcast program that is recognition target that have been output from the detection image data creation unit 260. Then, the sponsorship credit display segment estimation unit 270A generates a time-series signal indicating the presence or absence of the sponsorship credit display in each still image based on an output value of the detection model for each still image. Here, the sponsorship credit display segment estimation unit 270A applies the parameters stored in the parameter storage unit 230, learned for the day of the week on which the broadcast program that is recognition target is to be broadcast, to the detection model.

For example, when the detection model is a model using a convolutional neural network, the sponsorship credit display segment estimation unit 270A constructs a network (a detection model) in which the parameters stored in the parameter storage unit 230, learned for the day of the week on which the broadcast program that is the recognition target is to be broadcast, are used as fixed values.

If the output value of the detection model is at least a predetermined threshold value, the sponsorship credit display segment estimation unit 270A determines that the input still image is a still image with the sponsorship credit display, and for example, outputs a signal "1". When the output value of the detection model is less than the predetermined threshold value, the sponsorship credit display segment estimation unit 270A determines that the input still image is a still image without the sponsorship credit display, and for example, outputs a signal "0". The sponsorship credit display segment estimation unit 270A performs the above-described determination for each still image continuous in time-series of the recognition target broadcast program, and generates a binary time-series signal indicating the presence or absence of a sponsorship credit display in each still image with a signal "0" or a signal "1". That is, the sponsorship credit display segment estimation unit 270A generates a binary time-series signal that is a signal "1" for a segment estimated to be a sponsorship credit display segment, and a signal "0" for other segments. The sponsorship credit display segment estimation unit 270A outputs the generated binary time-series signal to the detection unit 170A.

Generally, the same broadcast program is often broadcast on the same day every week. In such a broadcast program, a sponsorship credit display tends to be displayed in the same format. Therefore, according to the image recognition unit 200A shown in FIG. 6, learning data is created for each day of the week, and the learning data is used to learn the parameters to be applied to the detection model for each day of the week, thereby improving the precision of detection of the sponsorship credit display.

Figure 7:
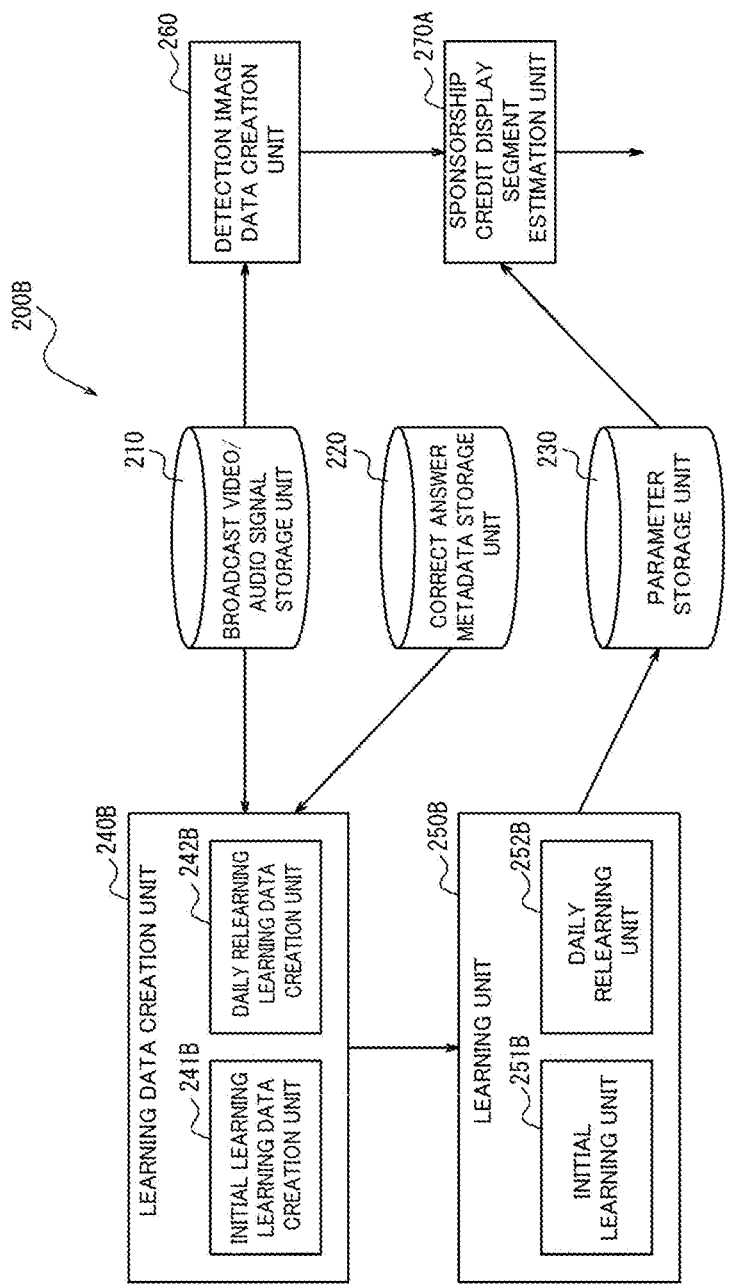
FIG. 7 shows still another example configuration of the image recognition unit shown in FIG. 4.

FIG. 7 shows an example configuration of an image recognition unit 200B that estimates a sponsorship credit display segment based on the video signal of a broadcast program. In FIG. 7, the same configurations as those in FIGS. 5 and 6 are designated by the same reference signs, and a description thereof will be omitted here.

The image recognition unit 200B shown in FIG. 7 differs from the image recognition unit 200A shown in FIG. 6 in that the learning data creation unit 240A is changed to a learning data creation unit 240B, and the learning unit 250A is changed to a learning unit 250B.

The learning data creation unit 240B acquires, for each day of the week, the video signal of a broadcast program whose sponsorship credit display has been detected from the broadcast video/audio signal storage unit 210. Further, the learning data creation unit 240B acquires the time information of the sponsorship credit display in that broadcast program from the correct answer metadata storage unit 220. The learning data creation unit 240B creates learning data for each day of the week from the broadcast program of each day of the week whose sponsorship credit display has been detected, and outputs the learning data to the learning unit 250B. Specifically, the learning data creation unit 240B creates as learning data, for each day of the week, from the broadcast program whose sponsorship credit display has been detected and time information of the sponsorship credit display, a still image with the sponsorship credit display and the time when the still image was broadcast, and a still image without the sponsorship credit display and the time when the still image was broadcast. The learning data creation unit 240B differs from the learning data creation unit 240A in that the initial learning learning data creation unit 241A is changed to the initial learning learning data creation unit 241B, and the daily relearning learning data creation unit 242A is changed to the daily relearning learning data creation unit 242B.

The initial learning learning data creation unit 241B acquires the video signal of a broadcast program whose sponsorship credit display has been detected from the broadcast video/audio signal storage unit 210. For example, the initial learning learning data creation unit 241B acquires the video signal of a broadcast program for one day one month ago. Further, the initial learning learning data creation unit 241B acquires the time information of the sponsorship credit display in the broadcast program for which the video signal was acquired from the correct answer metadata storage unit 220. Then, the initial learning learning data creation unit 241B creates learning data for initial learning of the detection model from the broadcast program whose sponsorship credit display has been detected, based on the time information of the sponsorship credit display in that broadcast program.

Specifically, the initial learning learning data creation unit 241B decodes the acquired video signal and creates still images that are continuous in time series at predetermined time intervals. For example, the initial learning learning data creation unit 241B creates a still image every one second. In this case, the initial learning learning data creation unit 241B creates, for example, 3900 still images that are continuous in time series at 1-second intervals for a broadcast program of 65 minutes.

Next, the initial learning learning data creation unit 241B, based on the acquired time information, extracts a still image with the sponsorship credit display from the generated still images, paired with the time when the still image was broadcast. In addition, the initial learning learning data creation unit 241B, based on the acquired time information, extracts a still image without the sponsorship credit display from the generated still images, paired with the time when the still image was broadcast. The still image without the sponsorship credit display is randomly extracted from the still images at times other than the time indicated by the acquired time information. The initial learning learning data creation unit 241B extracts, for example, about 8000 pairs each of the pair of a still image with the sponsorship credit display and the time when the still image was broadcast, and the pair of a still image without the sponsorship credit display and the time when the still image was broadcast. The initial learning learning data creation unit 241B outputs the pairs of a still image with the sponsorship credit display and the time when the still image was broadcast, and the pairs of a still image without the sponsorship credit display and the time when the still image was broadcast, that were extracted, to the learning unit 250B as learning data for initial learning of the detection model.

The daily relearning learning data creation unit 242B acquires, for each day of the week, the video signal of a broadcast program whose sponsorship credit display has been detected from the broadcast video/audio signal storage unit 210. For example, the daily relearning learning data creation unit 242B acquires the video signal of broadcast programs for each day one week ago. Further, the daily relearning learning data creation unit 242B acquires the time information of the sponsorship credit display in the broadcast programs for which the video signal was acquired from the correct answer metadata storage unit 220. Then, the daily relearning learning data creation unit 242B creates learning data for relearning of the detection model from the broadcast program whose sponsorship credit display was detected, for each day of the week, based on the time information of the sponsorship credit display in that broadcast program.

Specifically, the daily relearning learning data creation unit 242B decodes the acquired video signal and creates still images that are continuous in time-series at predetermined time intervals. For example, the daily relearning learning data creation unit 242B creates still images every one second. In this case, the daily relearning learning data creation unit 242B creates, for example, 3900 still images that are continuous in time series at 1-second intervals for a broadcast program of 65 minutes.

Next, the daily relearning learning data creation unit 242B, based on the acquired time information, extracts a still image with the sponsorship credit display from the generated still images, paired with the time when the still image was broadcast. In addition, the daily relearning learning data creation unit 242B, based on the acquired time information, extracts a still image without the sponsorship credit display from the generated still images, paired with the time when the still image was broadcast. The still image without the sponsorship credit display is randomly extracted from the still images at times other than the time indicated by the acquired time information. The daily relearning learning data creation unit 242B extracts, for example, about 1000 pairs each of the pair of a still image with the sponsorship credit display and the time when the still image was broadcast, and the pair of a still image without the sponsorship credit display and the time when the still image was broadcast. The daily relearning learning data creation unit 242B performs the above-described processing for each day of the week. Then, the daily relearning learning data creation unit 242B outputs the pairs of a still image with the sponsorship credit display and the time when the still image was broadcast, and the pairs of a still image without the sponsorship credit display and the time when the still image was broadcast, that were extracted for each day of the week, to the learning unit 250B as relearning data for each day of the week.

The learning unit 250B uses the learning data for each day of the week created by the learning data creation unit 240B to learn (relearn) the parameters to be applied to the detection model for each day of the week. The learning unit 250B includes an initial learning unit 251B and a daily relearning unit 252B.

The initial learning unit 251B learns parameters to be applied to the detection model for detecting the sponsorship credit display in the broadcast program using the learning data for initial learning created by the initial learning learning data creation unit 241B (the pairs of a still image with the sponsorship credit display and the time when the still image was broadcast, and the pairs of a still image without the sponsorship credit display and the time when the still image was broadcast). For example, when the detection model is a model using the above convolutional neural network, the initial learning unit 251B learns the filter weight and the bias parameters by using a probabilistic gradient method. The initial learning unit 251B stores the learned parameters in the parameter storage unit 230.

The daily relearning unit 252B uses the relearning data for each day of the week created by the daily relearning learning data creation unit 242B (the pairs of a still image with the sponsorship credit display and the time when the still image was broadcast, and the pairs of a still image without the sponsorship credit display and the time when the still image was broadcast) to learn the parameters to be applied to the detection model for detecting the sponsorship credit display in the broadcast program for each day of the week. The daily relearning unit 252B stores the learned parameters in the parameter storage unit 230.

It should be noted that, in FIG. 7, an example is illustrated in which the learning data creation unit 240B creates learning data for each day of the week, and the learning unit 250B uses the learning data created by the learning data creation unit 240B to learn the parameters to be applied to the detection model for each day of the week, but this is not a limitation. Here, the learning data is the pairs of a still image with the sponsorship credit display and the time when the still image was broadcast, and the pairs of a still image without the sponsorship credit display and the time when the still image was broadcast. As the learning data, the learning data creation unit 240B may also create pairs of a still image with the sponsorship credit display and the time when the still image was broadcast, and pairs of a still image without the sponsorship credit display and the time when the still image was broadcast, without distinguishing between the days of the week. That is, a configuration may be adopted in which the learning data creation unit 240B creates, as the learning data, from the broadcast program in which the sponsorship credit display has been detected, a still image with the sponsorship credit display and the time when the still image was broadcast, and a still image without the sponsorship credit display and the time when the still image was broadcast. Also, the learning unit 250B may learn the parameters applied to the detection model using the learning data created by the learning data creation unit 240B without distinguishing the days of the week.

Generally, the same broadcast program is often broadcast in the same time zone on the same day every week. In such a broadcast program, a sponsorship credit display tends to be displayed in the same format. Therefore, according to the image recognition unit 200B shown in FIG. 7, by creating, as the learning data, a still image with the sponsorship credit display and the time when the still image was broadcast, and a still image without the sponsorship credit display and the time when the still image was broadcast, and learning the parameters applied to the detection model using that learning data, it is possible to improve the precision of detection of the sponsorship credit display. It should be noted that in FIGS. 6 and 7, examples are illustrated in which creation of learning data and learning of parameters to be applied to the detection model are performed for each day of the week, but this is not a limitation. For example, creation of learning data and learning of parameters to be applied to the detection model may be performed separately for weekdays, Saturdays, and Sundays. Further, for example, creation of learning data and learning of parameters to be applied to the detection model may be performed for each broadcast program.

It should be noted that in the present embodiment, an example is described in which the detection model for detecting the sponsorship credit display in the broadcast program is constructed using a convolutional neural network, but this is not a limitation. The detection model for detecting the presence or absence of the sponsorship credit display may be constructed using, for example, an SVM (Support Vector Machine) or the like.

Figure 8:
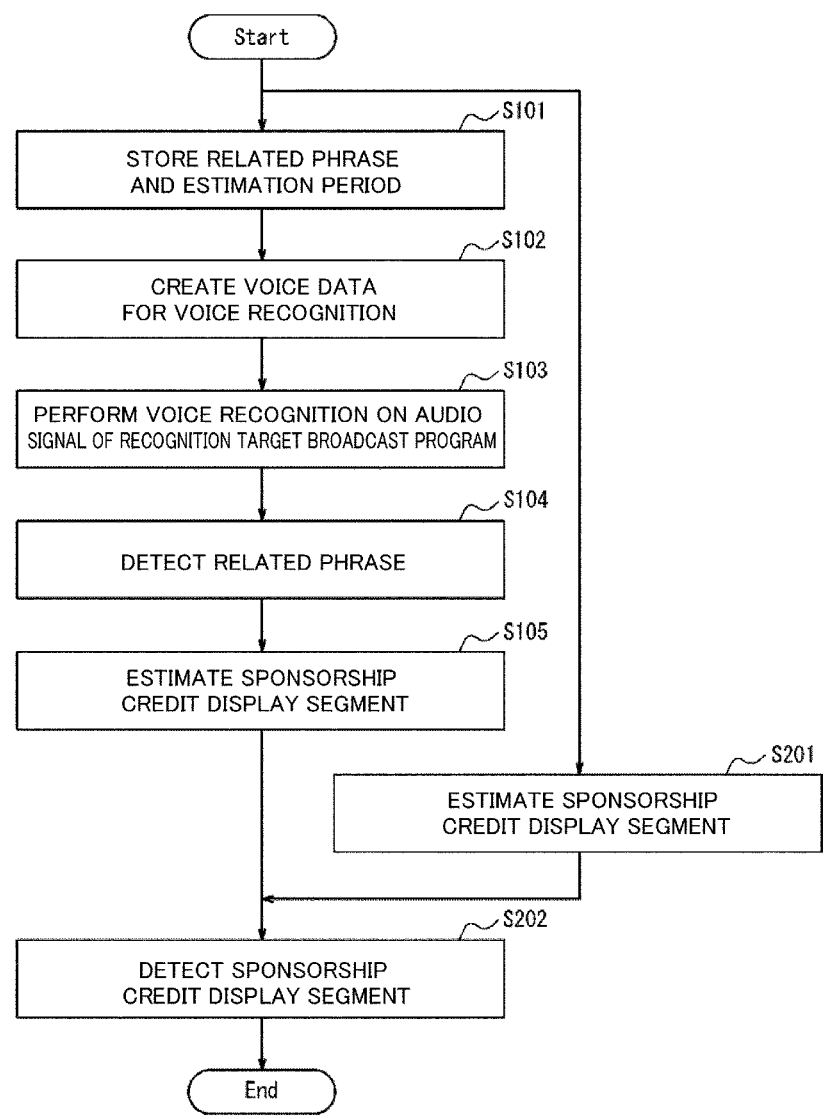
FIG. 8 is a flowchart showing an example of a sponsorship credit display detection method in the sponsorship credit display detection device shown in FIG. 4.

Next, a sponsorship credit display detection method in the sponsorship credit display detection device 100A according to the present embodiment will be described with reference to the flowchart shown in FIG. 8. It should be noted that in FIG. 8, the same processing as in FIG. 3 is designated by the same reference signs, and a description thereof will be omitted here.

In the sponsorship credit display detection device 100A according to the present embodiment, similar to the sponsorship credit display detection device 100 according to the first embodiment, the respective processing of storage of related phrases and estimation periods (step S101), creation of voice data for voice recognition (step S102), voice recognition for the audio signal of the recognition target broadcast program (step S103), detection of related phrases (step S104), and estimation of sponsorship credit display segments (step S105) is performed.

Further, the image recognition unit 200 estimates sponsorship credit display segments based on the video signal of the recognition target broadcast program (step S201). It should be noted that the processing of steps S101 to S105, and the processing of step S201, may be performed in parallel, or any of them may be performed first.

Next, the detection unit 170A, among segments obtained by a logical sum operation or a logical product operation of a sponsorship credit display segment estimated by the sponsorship credit display segment estimation unit 160 and a sponsorship credit display segment estimated by the image recognition unit 200, estimates a segment that continues for at least a predetermined time period as a sponsorship credit display segment. For example, when it is desired to detect sponsorship credit display segments without as little omission as possible, the detection unit 170A detects a sponsorship credit display segment with a logical sum operation. Also, when it is desired to reduce the false detection rate of sponsorship credit display segments as much as possible, the detection unit 170A detects a sponsorship credit display segment with a logical product operation.

Figure 9:
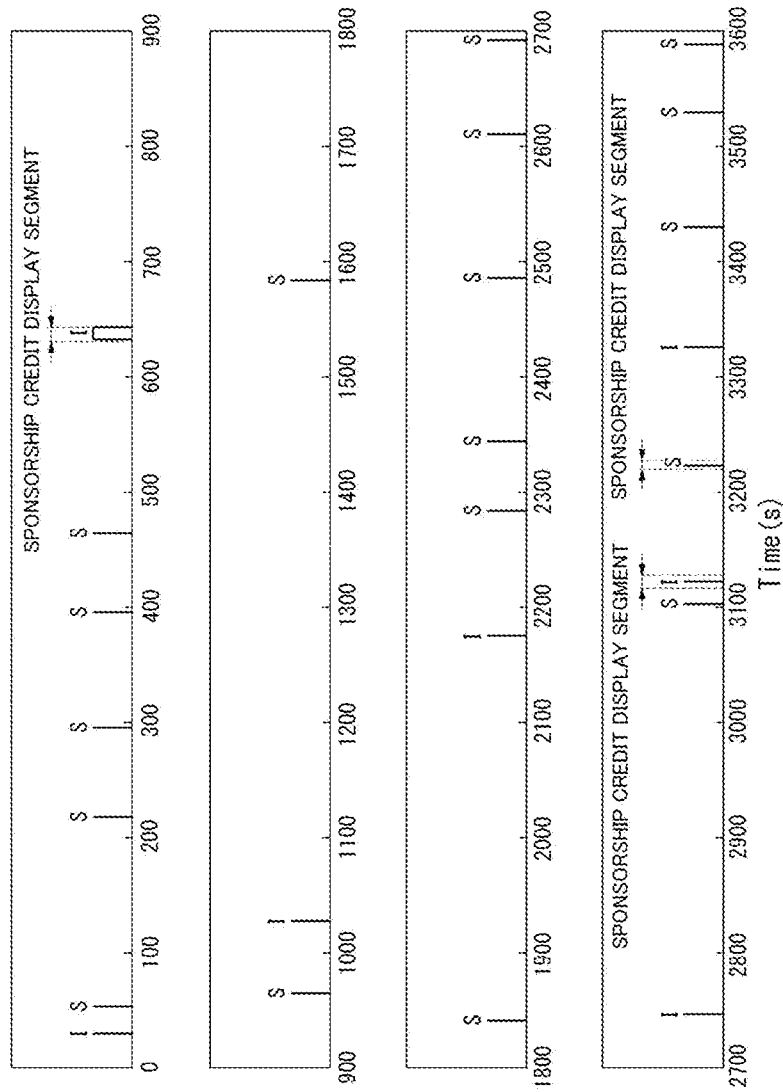
FIG. 9 shows an example of results of detection of sponsorship credit display segments in a broadcast program.

FIG. 9 shows an example of results of detection of sponsorship credit display segments in a broadcast program.

In FIG. 9, the horizontal axis represents time (seconds). In the example shown in FIG. 9, a sponsorship credit display segment exists in each of time intervals from 600 seconds to 700 seconds, 3100 seconds to 3200 seconds, and 3200 seconds to 3300 seconds. Further, in FIG. 9, a rise with the letter "S" at each time indicates times estimated to be sponsorship credit display segments (by the sponsorship credit display segment estimation unit 160) by voice recognition. Also, a rise with the letter "I" at each time indicates times estimated to be sponsorship credit display segments (by the image recognition unit 200) by image recognition.

As shown in FIG. 9, the sponsorship credit display segment existing between 600 seconds and 700 seconds and the sponsorship credit display segment existing between 3100 seconds and 3200 seconds are detected by image recognition, but are not detected by voice recognition. Further, the sponsorship credit display segment existing between 3200 seconds and 3300 seconds is detected by voice recognition, but is not detected by image recognition. Thus, the sponsorship credit display segments detectable by voice recognition may differ from the sponsorship credit display segments detectable by image recognition. Therefore, as in the present embodiment, by performing estimation of sponsorship credit display segments by image recognition and estimation of sponsorship credit display segments by voice recognition, and detecting sponsorship credit display segments by combining these estimation results, it is possible to detect sponsorship credit display segments without any omission and with higher precision.

Figure 10:
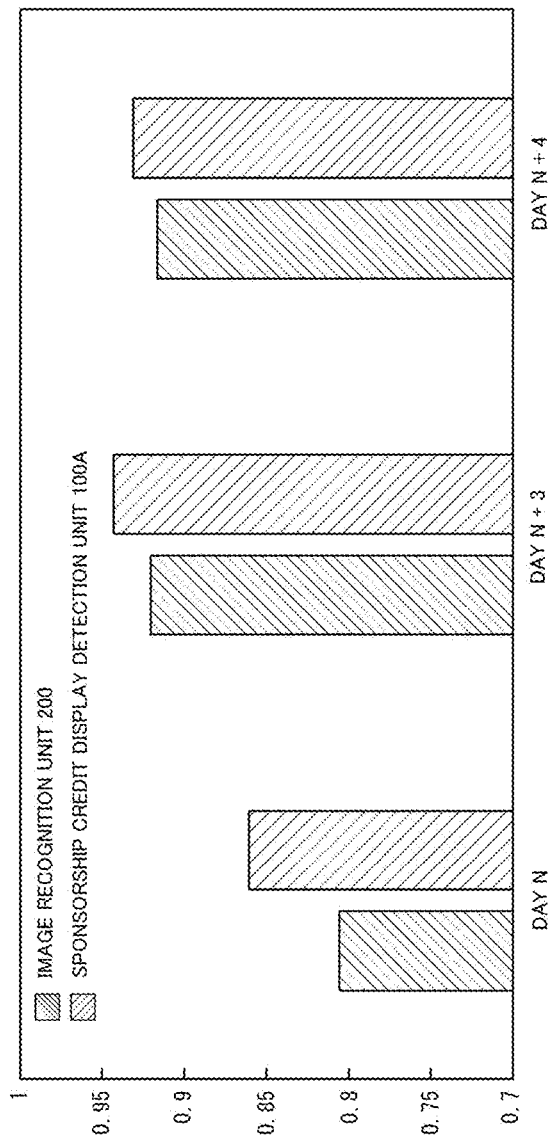
FIG. 10 shows evaluation results of the recall rate of detection of sponsorship credit display by using only the sponsorship credit display detection device and the image recognition unit shown in FIG. 4.

FIG. 10 shows an example of results of detection of sponsorship credit display by using only the sponsorship credit display detection device 100A and the image recognition unit 200 according to the present embodiment. FIG. 10 shows the recall rate of detection of sponsorship credit display by using only the sponsorship credit display detection device 100A and the image recognition unit 200, on a certain day (day N), three days after day N (day N+3) and four days after day N (day N+4), respectively. Note that the recall rate is a ratio of the actually detected sponsorship credit displays among sponsorship credit displays that should be detected.

As shown in FIG. 10, on any of day N, day N+3, and day N+4, the recall rate of detection of sponsorship credit display by the sponsorship credit display detection device 100A exceeds the recall rate of detection of sponsorship credit display by the image recognition unit 200 alone. Therefore, it is understood that the sponsorship credit display detection device 100A can detect sponsorship credit display segments without any omission and with higher precision than the image recognition unit 200 alone.

As described above, in the present embodiment, the sponsorship credit display detection device 100A includes the related phrase storage unit 120, the voice recognition unit 140, the related phrase detection unit 150, the sponsorship credit display segment estimation unit 160, the image recognition unit 200, and the detection unit 170A. The related phrase storage unit 120 stores a related phrase included in an announcement of a sponsorship credit display and related to the sponsorship credit display, in association with an estimation period where at least one predetermined period before or after an appearance time of the related phrase is estimated as the sponsorship credit display segment. The voice recognition unit 140 performs voice recognition on an audio signal of a broadcast program. The related phrase detection unit 150 detects a related phrase stored in the related phrase storage unit 120 from results of the voice recognition by the voice recognition unit 140. The sponsorship credit display segment estimation unit 160, using an appearance time of the related phrase detected by the related phrase detection unit 150 as a start point, estimates a period corresponding to the estimation period stored in the related phrase storage unit 120 in association with the detected related phrase as the sponsorship credit display segment. The image recognition unit 200 estimates the sponsorship credit display segment based on a video signal of the broadcast program. The detection unit 170A, among segments obtained by a logical sum operation or a logical product operation of a sponsorship credit display segment estimated by the sponsorship credit display segment estimation unit 160 and a sponsorship credit display segment estimated by the image recognition unit 200, estimates a segment that continues for at least a predetermined time period as a sponsorship credit display segment.

By performing estimation of sponsorship credit display segments by voice recognition and estimation of sponsorship credit display segments by image recognition, and detecting sponsorship credit display segments by combining these estimation results, it is possible to detect sponsorship credit display segments without any omission and with higher precision.

Although the sponsorship credit display detection devices 100 and 100A were described above, it is also possible to use a computer to function as the sponsorship credit display detection devices 100 and 100A. In such a computer, a computer program describing processing content that realizes each function of the sponsorship credit display detection devices 100 and 100A is stored in a storage unit of the computer, and these functions can be realized by a CPU of the computer reading and executing this computer program.

Also, the computer program may be recorded on a computer-readable recording medium. The computer program can be installed in a computer by using such a recording medium. In this case, the recording medium on which the computer program is recorded may be a non-transitory recording medium. The non-transitory recording medium is not particularly limited, but may be a recording medium such as a CD-ROM or a DVD-ROM, for example.

The above embodiments have been described as typical examples, but it will be obvious to those skilled in the art that many modifications and substitutions are possible within the spirit and scope of the present invention. Accordingly, the present invention should not be interpreted as being limited by the above-described embodiments, and various modifications and changes can be made without departing from the scope of the claims. For example, a plurality of constituent blocks described in the configuration figures of the embodiments can be combined into one constituent block, or one constituent block can be divided into a plurality of constituent blocks.

REFERENCE SIGNS LIST 100, 100A Sponsorship credit display detection device
110 Broadcast video/audio signal storage unit
120 Related phrase storage unit
130 Recognition voice data creation unit
140 Voice recognition unit
150 Related phrase detection unit
160 Sponsorship credit display segment estimation unit
170, 170A Detection unit 200, 200A, 200B Image recognition unit
210 Broadcast video/audio signal storage unit
220 Correct answer metadata storage unit
230 Parameter storage unit
240, 240A, 240B Learning data creation unit
241A, 241B Initial learning data creation unit
242A, 242B Daily relearning data creation unit
250, 250A, 250B Learning unit
251A, 251B Initial learning unit
252A, 252B Daily relearning unit
260 Detection image data creation unit
270, 270A Sponsorship credit display segment estimation unit

The invention claimed is:

1. A sponsorship credit display detection device for determining a sponsorship credit display segment associated with a broadcast program, the device comprising a processor configured to execute a method comprising:
    storing a combination including a phrase of a plurality of phrases associated with a sponsorship credit display segment and an estimation period of the sponsorship credit display segment associated with the phrase, wherein the estimation period indicates a time period starting at a time when the sponsorship credit display segment starts and ending at a time when the phrase is spoken during the sponsorship credit display segment;
    generating voice data of the broadcast program as an output of a voice recognition acoustic model/language model that recognizes voice from an audio signal of the broadcast program received as an input by dividing a target phrase into a plurality of recognized phrases and transcribing the plurality of recognized phrases as text data, wherein the voice data comprises the text data, word identifiers that identify the plurality of recognized phrases, start times of the plurality of recognized phrases, and end times of the plurality of recognized phrases;
    detecting the stored phrase from the voice data;
    generating, based on the detected phrase, time series data, wherein the time series data include at least binary time series data indicating one or more times when one or more phrases of the plurality of phrases are spoken in a time series corresponding to the broadcast program;
    estimating, using the time series data and the estimation period, a segment period, wherein the segment period corresponds to the sponsorship credit display segment including the stored phrase in the broadcast program, and wherein the segment period starts at a beginning of the estimation period prior to the time of the detected phrase spoken; and
    determining a part of the broadcast program according to the segment period in the broadcast program as the sponsorship credit display segment associated with the broadcast program, wherein the sponsorship credit display segment is longer than the estimation period.

2. The sponsorship credit display detection device according to claim 1, further comprising:
    estimating the sponsorship credit display segment based on a video signal of the broadcast program; and
    estimating, based at least on a logical sum operation or a logical product operation upon data associated with the broadcast program, a segment that includes the stored phrase being spoken and continues for at least a predetermined time period as the sponsorship credit display segment associated with the broadcast program.

3. The sponsorship credit display detection device according to claim 1, wherein the estimated period of the sponsorship credit display segment including the stored phrase depends on when the stored phrase is likely to be spoken during the sponsorship credit display.

4. The sponsorship credit display detection device according to claim 1, wherein the detecting the stored phrase further comprises outputting time information of the detected sponsorship credit display segment.

5. The sponsorship credit display detection device according to claim 2, wherein the estimated period of the sponsorship credit display segment including the stored phrase depends on when the stored phrase is likely to be spoken during the sponsorship credit display.

6. The sponsorship credit display detection device according to claim 2, wherein the detecting the stored phrase further comprises outputting time information of the detected sponsorship credit display segment.

7. The sponsorship credit display detection device according to claim 1, wherein the phrase includes a name of a sponsor of the broadcast program.

8. A computer implemented method for determining a sponsorship credit display segment associated with a broadcast program, the method comprising:
    storing a combination of a phrase of a plurality of phases associated with a sponsorship credit display segment and an estimation period of the sponsorship credit display segment associated with the phrase, wherein the estimation period indicates a time period starting at a time when the sponsorship credit display segment starts and ending at a time when the phrase is spoken during the sponsorship credit display segment;
    generating voice data of the broadcast program as an output of a voice recognition acoustic model/language model that recognizes voice from an audio signal of the broadcast program received as an input by dividing a target phrase into a plurality of recognized phrases and transcribing the plurality of recognized phrases as text data, wherein the voice data comprises the text data, word identifiers that identify the plurality of recognized phrases, start times of the plurality of recognized phrases, and end times of the plurality of recognized phrases;
    detecting the stored phrase from the voice data;
    generating, based on the detected phrase, time series data, wherein the time series data include at least binary time series data indicating one or more times when one or more phrases of the plurality of phrases are spoken in a time series corresponding to the broadcast program;
    estimating, using the time series data and the estimation period, a segment period, wherein the segment period corresponds to the sponsorship credit display segment including the stored phrase in the broadcast program, wherein the segment period starts at a beginning of the estimation period prior to the time of the detected phrase spoken; and
    determining a part of the broadcast program according to the segment period in the broadcast program as the sponsorship credit display segment associated with the broadcast program, wherein the sponsorship credit display segment is longer than the estimation period.

9. The sponsorship credit display detection method according to claim 8, further comprising:
    estimating the sponsorship credit display segment based on a video signal of the broadcast program; and
    estimating, based at least on a logical sum operation or a logical product operation upon data associated with the broadcast program, a segment that includes the stored phrase being spoken and continues for at least a predetermined time as the sponsorship credit display segment associated with the broadcast program.

10. The sponsorship credit display detection method of claim 8, wherein the estimated period of the sponsorship credit display segment including the stored phrase depends on when the stored phrase is likely to be spoken during the sponsorship credit display.

11. The sponsorship credit display detection method of claim 8, wherein the detecting the stored phrase further comprises outputting time information of the detected sponsorship credit display segment.

12. The sponsorship credit display detection method of claim 9, wherein the estimated period of the sponsorship credit display segment including the stored phrase depends on when the stored phrase is likely to be spoken during the sponsorship credit display.

13. The sponsorship credit display detection method of claim 9, wherein the detecting the stored phrase further comprises outputting time information of the detected sponsorship credit display segment.

14. The sponsorship credit display detection method according to claim 8, wherein the phrase includes a name of a sponsor of the broadcast program.

15. A system for determining a sponsorship credit display segment associated with a broadcast program, the system comprising:
   a processor configured to execute a method comprising:
      storing a combination including a phrase of a plurality of phrases associated with a sponsorship credit display segment and an estimation period of the sponsorship credit display segment associated with the phrase, wherein the estimation period indicates a time period starting at a time when the sponsorship credit display segment starts and ending at a time when the phrase is spoken during the sponsorship credit display segment;
      generating voice data associated with a broadcast program as an output of a voice recognition acoustic model/language model that recognizes voice from an audio signal of the broadcast program received as an input by dividing a target phrase into a plurality of recognized phrases and transcribing the plurality of recognized phrases as text data, wherein the voice data comprises the text data, word identifiers that identify the plurality of recognized phrases, start times of the plurality of recognized phrases, and end times of the plurality of recognized phrases;
      detecting the stored phrase from the voice data;
      generating, based on the detected phrase, time series data, wherein the time series data include at least binary time series data indicating one or more times when one or more phrases of the plurality of phrases are spoken in a time series corresponding to the broadcast program;
      estimating, using the time series data and the estimation period, a segment period, wherein the segment period corresponds to the sponsorship credit display segment including the stored phrase in the broadcast program, and wherein the segment period starts at a beginning of the estimation period prior to the time of the detected phrase spoken; and
      determining, a part of the broadcast program according to the segment period in the broadcast program as the sponsorship credit display segment associated with the broadcast program.

16. The system according to claim 15, the processor further configured to execute a method, comprising:
   estimating the sponsorship credit display segment based on a video signal of the broadcast program: and
   estimating, based at least on a logical sum operation or a logical product operation upon data associated with the broadcast program, a segment that continues for at least a predetermined time period as the sponsorship credit display segment associated with the broadcast program.

17. The system according to claim 15, wherein the estimated period of the sponsorship credit display segment including the stored phrase depends on when the stored phrase is likely to be spoken during the sponsorship credit display.

18. The system according to claim 15, wherein the detecting the stored phrase further comprises outputting time information of the detected sponsorship credit display segment.

19. The system according to claim 16, wherein the estimated period of the sponsorship credit display segment including the stored phrase depends on when the stored phrase is likely to be spoken during the sponsorship credit display.

20. The system according to claim 16, wherein the detecting the stored phrase further comprises outputting time information of the detected sponsorship credit display segment.

* * * * *